(12) United States Patent  
Li

(10) Patent No.: US 11,140,138 B2  
(45) Date of Patent: Oct. 5, 2021

(54) METHOD FOR ENCRYPTING AN IMAGE, METHOD FOR TRANSMITTING AN IMAGE, ELECTRONIC DEVICE AND COMPUTER READABLE STORAGE MEDIUM

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 249 days.

(21) Appl. No.: 16/421,767

(22) Filed: May 24, 2019

(65) Prior Publication Data

US 2020/0028826 A1    Jan. 23, 2020

(30) Foreign Application Priority Data

Jul. 20, 2018 (CN) .......................... 201810806492.1

(51) Int. Cl.
*H04L 29/06* (2006.01)
*G06T 7/11* (2017.01)
(Continued)

(52) U.S. Cl.
CPC ............ *H04L 63/0428* (2013.01); *G06T 7/11* (2017.01); *H04L 9/0825* (2013.01); *H04L 9/14* (2013.01)

(58) Field of Classification Search
CPC ..... H04L 63/0428; H04L 9/0825; H04L 9/14; H04L 9/06; H04L 9/0869; G06T 7/11;
(Continued)

(56) References Cited

U.S. PATENT DOCUMENTS 6,519,340 B1    2/2003 Javidi
6,687,406 B2 *  2/2004 Ito .............................. G06T 9/00
                                                                   382/100
(Continued)

FOREIGN PATENT DOCUMENTS

CN        104680077 A    6/2015
CN        105491443 A    4/2016
(Continued)

OTHER PUBLICATIONS

K. C. Ravishankar and M. G. Venkateshmurthy, "Region based selective image encryption," 2006 International Conference on Computing & Informatics, Kuala Lumpur, Malaysia, 2006, pp. 1-6, doi: 10.1109/ICOCI.2006.5276550. (Year: 2006).*

(Continued)

*Primary Examiner* — Michael R Vaughan
(74) *Attorney, Agent, or Firm* — Nath, Goldberg & Meyer; Joshua B. Goldberg

(57) ABSTRACT

A method for encrypting an image, a method for transmitting an image, an electronic device, and a computer readable storage medium are provided. The method for encrypting an image includes steps of extracting an outline of an original image to obtain a binarized outline image and dividing the original image into a first image and a second image based on the binarized outline image. The second image comprises at least one encrypted region of the original image, and the first image comprises the remaining region of the original image other than the at least one encrypted region, the remaining region being an unencrypted region.

20 Claims, 7 Drawing Sheets

(51) Int. Cl.
*H04L 9/08* (2006.01)
*H04L 9/14* (2006.01)

(58) Field of Classification Search
CPC ......... G06T 7/12; G06T 7/136; G06K 9/4652; G06K 9/3233; G06K 9/48; G06F 21/6209; H04N 1/32272
See application file for complete search history.

(56) References Cited

U.S. PATENT DOCUMENTS

| | | | | |
|---|---|---|---|---|
| 8,433,067 | B2* | 4/2013 | Nakagata | G09C 5/00 380/205 |
| 9,396,310 | B2* | 7/2016 | de los Reyes | H04L 9/088 |
| 10,706,161 | B2* | 7/2020 | Engel | G06F 3/04842 |
| 2010/0074443 | A1* | 3/2010 | Ishii | H04N 1/32144 380/243 |
| 2013/0083965 | A1* | 4/2013 | Joung | G06T 7/174 382/103 |
| 2015/0009248 | A1* | 1/2015 | Bracalente | H04N 1/00838 345/691 |
| 2015/0090791 | A1* | 4/2015 | Zhang | G06K 7/1478 235/462.04 |
| 2015/0090792 | A1* | 4/2015 | Zhang | G06K 7/1417 235/462.04 |
| 2015/0304736 | A1* | 10/2015 | Lal | G06F 21/72 380/210 |
| 2016/0217293 | A1* | 7/2016 | Farkash | H04L 63/20 |
| 2018/0234588 | A1* | 8/2018 | Chen | G06Q 20/367 |
| 2020/0042769 | A1* | 2/2020 | Yan | G06K 9/00248 |

FOREIGN PATENT DOCUMENTS

| | | |
|---|---|---|
| CN | 107302706 A | 10/2017 |
| CN | 107507239 A * | 12/2017 |
| CN | 107563977 A | 1/2018 |
| KR | 101746167 B1 * | 6/2017 |

OTHER PUBLICATIONS

E. J. Kusuma, O. R. Indriani, C. A. Sari, E. H. Rachmawanto and D. R. I. M. Setiadi, "An imperceptible LSB image hiding on edge region using DES encryption," 2017 International Conference on Innovative and Creative Information Technology (ICITech), Salatiga, 2017, pp. 1-6. (Year: 2017).*

Kanso, A., and M. Ghebleh. "An efficient and robust image encryption scheme for medical applications." Communications in Nonlinear Science and Numerical Simulation 24.1-3 (2015): 98-116. (Year: 2015).*

G. Mehta, M. K. Dutta, C. M. Travieso-González and P. S. Kim, "Edge based selective encryption scheme for biometric data using chaotic theory," 2014 International Conference on Contemporary Computing and Informatics (IC3I), Mysore, India, 2014, pp. 383-386. (Year: 2014).*

Ji, Shiyu, Xiaojun Tong, and Miao Zhang. "Image encryption schemes for JPEG and GIF formats based on 3D baker with compound chaotic sequence generator." arXiv preprint arXiv: 1208.0999 (2012). (Year: 2012).*

First Office Action dated May 15, 2019 corresponding to Chinese application No. 201810806492.1.

* cited by examiner

```
┌─────────────────────────────────────────────────┐
│ Receiving, by a second device, a GIF image transmitted from a │
│ first device, wherein the GIF image comprises a first image and a │
│ second image, the second image comprises at least one │
│ encrypted region of an original image, the first image comprises │──801
│ the remaining region of the original image other than the at least │
│ one encrypted region, and the remaining region is an unencrypted │
│                    region                       │
└─────────────────────────────────────────────────┘
                          │
                          ▼
┌─────────────────────────────────────────────────┐
│ Restoring the original image from the GIF image by the second │──802
│                    device                       │
└─────────────────────────────────────────────────┘
```

FIG. 8

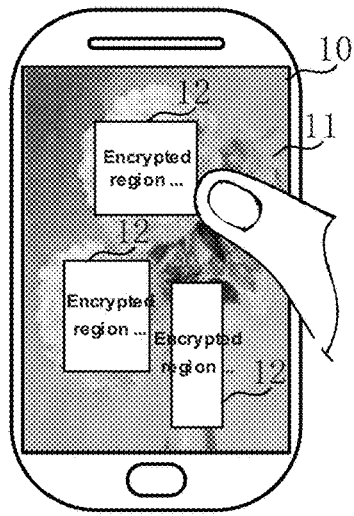

FIG. 9

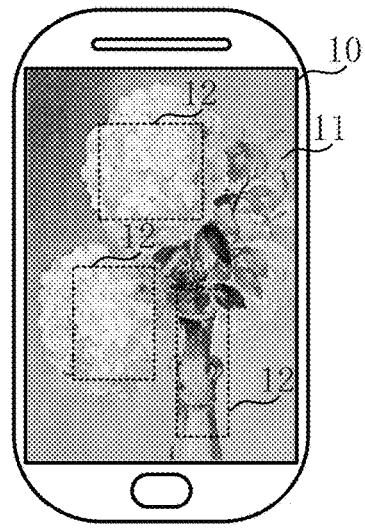

FIG. 10

METHOD FOR ENCRYPTING AN IMAGE, METHOD FOR TRANSMITTING AN IMAGE, ELECTRONIC DEVICE AND COMPUTER READABLE STORAGE MEDIUM

CROSS-REFERENCE TO RELATED APPLICATIONS

The present application claims the priority of Chinese Patent Application No. 201810806492.1, filed on Jul. 20, 2018, the contents of which are incorporated herein in their entirety by reference.

TECHNICAL FIELD

The present disclosure relates to the technology field for processing an image, and in particular, relates to a method for encrypting an image, a method for transmitting an image, an electronic device, and a computer readable storage medium.

BACKGROUND

At present, a user may enjoy artworks such as an image, a painting, and the like over the Internet by using a terminal device, to meet his/her spiritual and cultural needs. In reality, most of these artworks have copyrights, and if the artworks are accessed without permission or illegally transmitted, then the motivation of the relevant creator and the benefit of the relevant operator may be damaged. Therefore, it is desirable to efficiently and safely transmit the artworks such as an image, a painting, and the like.

SUMMARY

Embodiments of the present disclosure provide a method for encrypting an image, a method for transmitting an image, an electronic device, and a computer readable storage medium.

An aspect of the present disclosure provides a method for encrypting an image, the method including steps of extracting an outline of an original image to obtain a binarized outline image; and dividing the original image into a first image and a second image based on the binarized outline image, wherein the second image includes at least one encrypted region of the original image, the first image includes the remaining region of the original image other than the at least one encrypted region, and the remaining region is an unencrypted region.

In an embodiment, the step of dividing the original image into a first image and a second image based on the binarized outline image includes steps of determining a to-be-encrypted region of the original image based on the binarized outline image; and encrypting the to-be-encrypted region of the original image to obtain the second image.

In an embodiment, the step of dividing the original image into a first image and a second image based on the binarized outline image further includes a step of filling the to-be-encrypted region of the original image to obtain the first image.

In an embodiment, the step of determining a to-be-encrypted region of the original image based on the binarized outline image includes steps of dividing the binarized outline image into a plurality of binarized outline regions;

for each binarized outline region, calculating a number of pixels each having a nonzero pixel value in the binarized outline region, to obtain a pixel density value of the binarized outline region; and determining a region of the original image corresponding to the binarized outline region, which has the pixel density value greater than or equal to a preset density threshold value, as the to-be-encrypted region.

In an embodiment, the step of determining a to-be-encrypted region of the original image based on the binarized outline image includes steps of dividing the binarized outline image into a plurality of binarized outline regions having an identical area;

for each binarized outline region, calculating a number of pixels each having a grayscale value greater than or equal to a grayscale threshold value; and determining a region of the original image corresponding to the binarized outline region, which has the number of pixels greater than or equal to a quantity threshold, as the to-be-encrypted region.

In an embodiment, the step of determining a to-be-encrypted region of the original image based on the binarized outline image includes steps of dividing the binarized outline image into a plurality of binarized outline regions having an identical area;

moving a sliding window having a preset size rightwards or downwards by a preset step size to pass through the plurality of binarized outline regions sequentially, to obtain a number of pixels each having a nonzero pixel value in a region where the sliding window is located; and determining a region of the original image corresponding to the binarized outline region, which has the number of pixels greater than or equal to a quantity threshold, as the to-be-encrypted region.

In an embodiment, the step of determining a to-be-encrypted region of the original image based on the binarized outline image includes steps of obtaining a pixel value gradient map of the original image;

determining a plurality of pixel value gradient map regions, which have local maximum pixel values in the pixel value gradient map; and determining a region of the original image corresponding to the pixel value gradient map region, which has the local maximum pixel value greater than or equal to a reference gradient value, as the to-be-encrypted region.

In an embodiment, the step of filling the to-be-encrypted region of the original image to obtain the first image includes a step of replacing a pixel value of each pixel in the to-be-encrypted region with a pixel value of a predetermined color.

In an embodiment, the step of filling the to-be-encrypted region of the original image to obtain the first image includes a step of replacing a pixel value of each pixel in the to-be-encrypted region with a random data ranging from 0 to 255.

In an embodiment, the step of filling the to-be-encrypted region of the original image to obtain the first image includes a step of replacing pixel values of pixels in the to-be-encrypted region with pixel values of pixels of a specified image.

In an embodiment, the method further includes a step of storing the first image and the second image as different frames of a same GIF image.

In an embodiment, the first image is a first frame of the GIF image, and the second image is any one or more frames of the GIF image following the first frame.

In an embodiment, the method further includes a step of storing the first image and the second image at different positions.

Another aspect of the present disclosure provides a method for transmitting an image, the method including steps of transmitting, by a first device, a GIF image to a second device, wherein the GIF image includes a first image and a second image, the second image includes at least one encrypted region of an original image, the first image includes the remaining region of the original image other than the at least one encrypted region, and the remaining region is an unencrypted region;

receiving, by the second device, the GIF image transmitted from the first device; and restoring the original image from the GIF image by the second device.

In an embodiment, the first device is a server or a terminal device, and the second device is a server or a terminal device.

In an embodiment, a key for decrypting the second image is stored in the second device.

In an embodiment, the step of restoring the original image from the GIF image by the second device includes steps of decrypting the at least one encrypted region included in the second image; and superposing the at least one encrypted region on the remaining region included in the first image.

Still another aspect of the present disclosure provides a method for transmitting an image, the method including steps of extracting, by a first device, an outline of an original image to obtain a binarized outline image;

dividing, by the first device, the original image into a first image and a second image, based on the binarized outline image, wherein the second image comprises at least one encrypted region of the original image, the first image comprises the remaining region of the original image other than the at least one encrypted region, and the remaining region is an unencrypted region;

storing, by the first device, the first image and the second image as different frames of a same GIF image;

receiving, by the first device, an original image obtaining request generated by a second device based on a trigger event;

obtaining, by the first device, a GIF file corresponding to the original image obtaining request; and sending, by the first device, the GIF file to the second device.

Yet another aspect of the present disclosure provides an electronic device, which includes a processor; and a memory storing therein program instructions executable by the processor, wherein the processor is configured to read the program instructions from the memory to implement the steps of the method according to any one of the foregoing embodiments of the present disclosure.

An aspect of the present disclosure provides a computer readable storage medium, which includes program instructions stored therein, wherein the program instructions is executable by a processor to implement the steps of the method according to any one of the foregoing embodiments of the present disclosure.

BRIEF DESCRIPTION OF THE DRAWINGS

The accompanying drawings provided herein illustrate embodiments consistent with the present inventive concept, constitute a portion of the specification, and are for the purpose of explaining the present inventive concept together with the specification, wherein

FIG. 8 is a schematic flowchart showing a method for transmitting an image according to an embodiment of the present disclosure;

FIG. 9 is a schematic diagram showing an effect that a user who has no access permission to an encrypted region of an original image can only see an unencrypted region of the original image, according to an embodiment of the present disclosure;

FIG. 10 is a schematic diagram showing an original image restored from an encrypted region and an unencrypted region of the original image by a user who has access permission to the encrypted region, according to an embodiment of the present disclosure;

DETAILED DESCRIPTION

Figure 1:
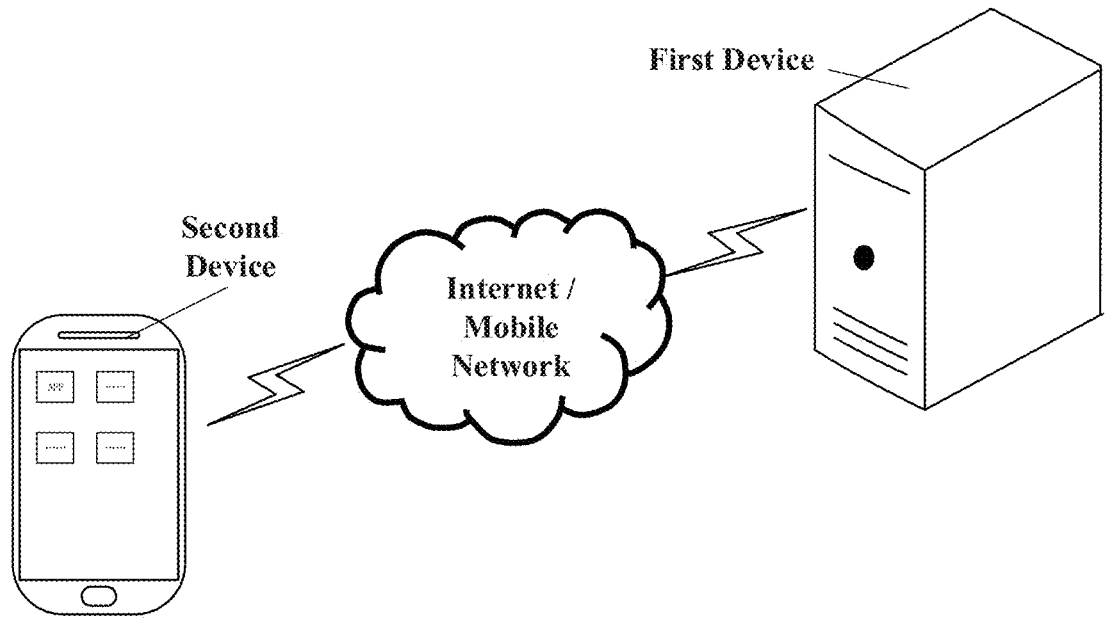
FIG. 1 is a schematic diagram showing an application scenario (e.g., an image transmission system) according to an embodiment of the present disclosure.

Exemplary embodiments will be described below in detail, and some examples are shown in the accompanying drawings. In the following description with reference to the accompanying drawings, a same reference numeral in different figures denotes same or similar elements, unless otherwise indicated. The implementations described in the following exemplary embodiments are not exhaustive of all embodiments consistent with the present disclosure, but are merely examples of devices and methods consistent with aspects of the present disclosure as defined in the appended claims.

The inventor of the present inventive concept found that, in order to safely transmit artworks such as an image and the like, in an existing method, the entire of an image is encrypted, then the encrypted image is sent to a terminal device, and finally the image is decrypted and restored from the encrypted image by the terminal device. However, encrypting the entire image will result in a significant increase in image data, thereby increasing the transmission time; and the terminal device also takes a long time to decrypt the received encrypted image, causing real-time restoration of the encrypted image to be impossible. Thus, there is a delay each time a user watches an image, causing the user experience to be poor.

In view of the foregoing, embodiments of the present disclosure provide a method for encrypting an image and a method for transmitting an image. The method for transmitting an image may be applied to a first device and a second device which constitute an image transmission system, and the method for encrypting an image may be applied to the first device, the second device, or a combination of the first and second devices. Referring to FIG. 1, the first device and the second device may communicate with each other via the Internet or a mobile network. As such, the second device may generate an original image obtaining request according to a trigger event of a user. After the second device sends the original image obtaining request to the first device, the first device may feed back (e.g., provide) a first image and a second image corresponding to an original image or a Graphics Interchange Format (GIF) file (e.g., a GIF image) corresponding to the original image to the second device, in response to receiving the original image obtaining request.

In the present embodiment, before providing a feedback to the second device, the first device may perform a method for encrypting an original image, to generate a first image and a second image corresponding to the original image. The method for encrypting an image may include extracting, by the first device, an outline of the original image to obtain a binarized outline image. Next, the original image may be divided by the first device into the first image and the second image, based on the binarized outline image, such that the second image includes at least one encrypted region of the original image, the first image includes the remaining region of the original image other than the at least one encrypted region, and the remaining region is an unencrypted region. For example, the second image may include N (where N is a positive integer) image frames. In other words, the second image may include N encrypted regions, and each of the encrypted regions is one image frame.

In a case where a GIF file is fed back by the first device, the method for encrypting an image may further include storing the first image and the second image as different frames of a same GIF image (i.e., the GIF file). It should be noted that, the GIF file may be generated by the first device in advance, or may be generated in response to the original image obtaining request from the second device, and the present disclosure is not specifically limited in this regard. Further, a method for generating the GIF file from the original image will be described hereinafter.

It should be noted that, the first device may be a server or a terminal device, and the second device may also be a server or a terminal device. For example, the server may be any one of suitable computers, and the terminal device may be a desktop computer, a notebook computer, a tablet computer, a smart phone, a personal digital assistant (PDA), or the like. In order to facilitate understanding of the technical solutions of the present disclosure, description of subsequent embodiments will be made by taking the case where the first device is the server and the second device is the terminal device as an example.

Figure 2:
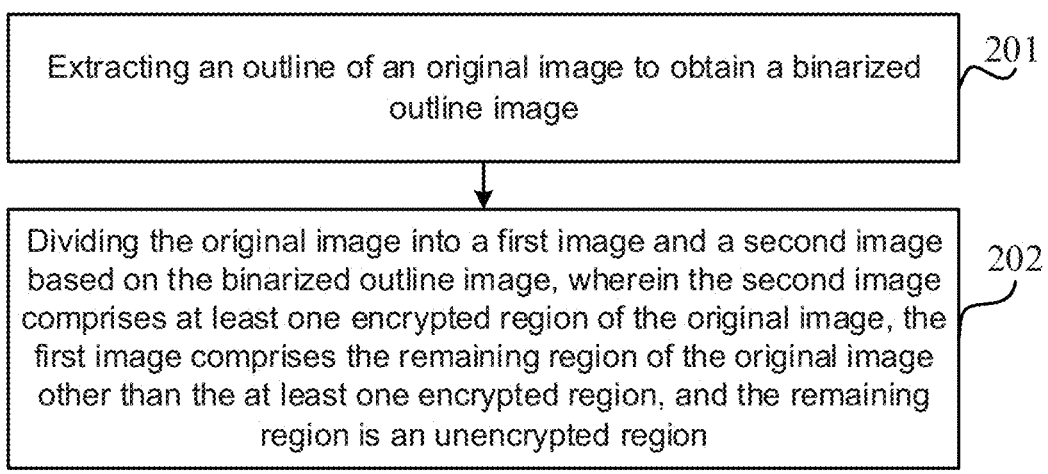
FIG. 2 is a schematic flowchart showing a method for encrypting an image according to an embodiment of the present disclosure.

FIG. 2 is a schematic flowchart showing a method for encrypting an image according to an embodiment of the present disclosure. The method may be applied to the first device, and the first device may be the server. Referring to FIG. 2, the method for encrypting an image may include steps 201 and 202.

At step 201, an outline of an original image is extracted to obtain a binarized outline image.

In the present embodiment, the server (i.e., the first device) may determine the original image upon receiving an image uploaded by a user or in response to an original image obtaining request transmitted from the second device. Next, the server may extract an outline of the original image by using a preset image outline extraction algorithm, to obtain the binarized outline image.

For ease of description, a pixel value of each pixel in the binarized outline image may be denoted as 0 or 1.

For example, the image outline extraction algorithm may be a region-based outline (or contour) extraction algorithm, an edge-based outline extraction algorithm, an active outline-based outline extraction algorithm, or a visual property-based outline extraction algorithm. For example, the edge-based outline extraction algorithm may include a Roberts algorithm, a Prewitt algorithm, a Sobel algorithm, and/or a Lapacaian algorithm. However, the present disclosure is not limited thereto, and one of ordinary skill in the art may employ an appropriate outline (or contour) extraction algorithm according to a specific scenario.

At step 202, the original image is divided into the first image and the second image based on the binarized outline image, such that the second image includes at least one encrypted region of the original image, the first image includes the remaining region of the original image other than the at least one encrypted region, and the remaining region is an unencrypted region.

In the present embodiment, the server may divide the original image into the first image and the second image. For example, the second image includes N image frames, and is an image corresponding to the at least one encrypted region of the original image, where N is a positive integer.

Figure 3:
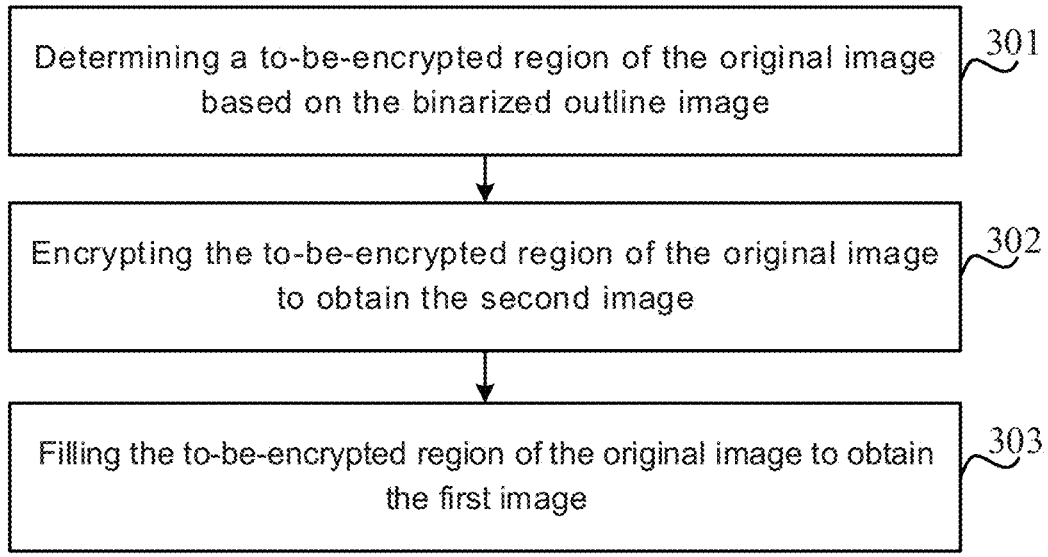
FIG. 3 is a schematic flowchart showing a method for obtaining a first image and a second image according to an embodiment of the present disclosure.

In the present embodiment, as shown in FIG. 3, generating the first image and the second image by the server may include steps 301 to 303.

At step 301, a to-be-encrypted region of the original image is determined based on the binarized outline image (it should be noted that, the number of the to-be-encrypted regions of the original image is equal to the number of the encrypted regions of the original image), and step 301 may be performed in any one of the following first to fourth manners.

Figure 4:
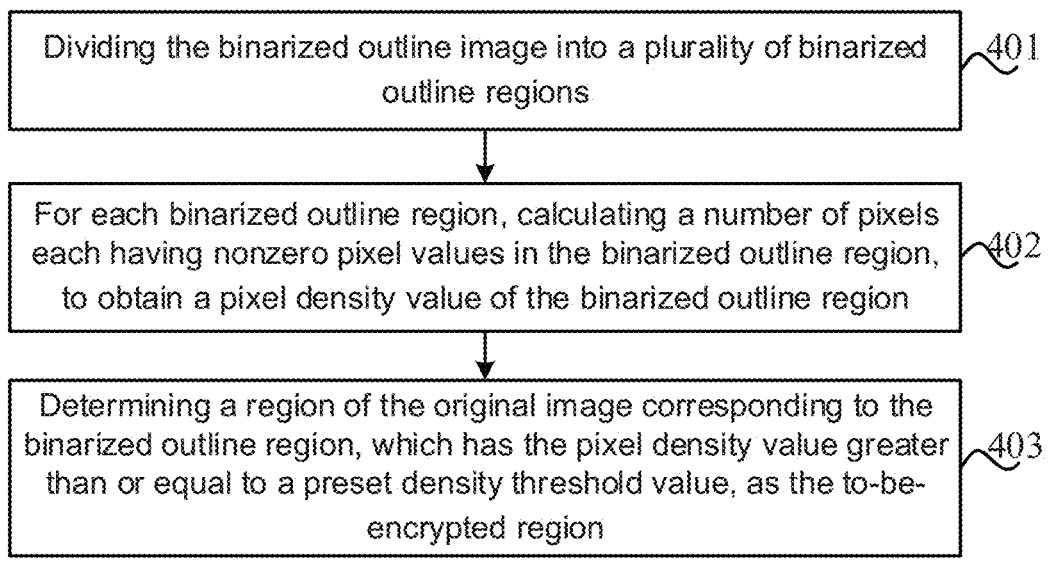
FIG. 4 is a schematic flowchart showing a method for obtaining to-be-encrypted regions (i.e., a first method for obtaining N to-be-encrypted regions) of an original image according to an embodiment of the present disclosure.

The first manner is as follows. Referring to FIG. 4, the server may firstly divide the binarized outline image into a plurality of binarized outline regions (step 401), and the binarized outline image may be divided into a plurality of binarized outline regions which have an identical (or equal, or same) area, or may be divided into a plurality of binarized outline regions randomly such that the plurality of binarized outline regions may have different areas. Next, for each of the plurality of binarized outline regions (i.e., each divided region), the server computes the number (i.e., quantity) of pixels each having a nonzero pixel value in the binarized outline region, to obtain a pixel density value of the binarized outline region (step 402). For example, the pixel density value may be a ratio of the number of pixels each having a nonzero pixel value in the binarized outline region to an area of the binarized outline region. In a case where the plurality of binarized outline regions have an identical area, the number of pixels each having a nonzero pixel value in each of the plurality of binarized outline regions may be directly taken as the pixel density value, thereby reducing the amount of calculation. In a case where the pixel density value of the binarized outline region is greater than or equal to a preset density threshold value, a region of the original image corresponding to the binarized outline region is determined as a to-be-encrypted region of the original image (step 403). For example, the preset density threshold value may be set according to an empirical value, or may be obtained by using a statistical method.

Figures 5A, 5B, 5C:
FIGS. 5(a) to 5(c) are schematic diagrams showing results of steps of a second method for obtaining N to-be-encrypted regions of an original image according to an embodiment of the present disclosure.

The second manner is as follows. Referring to FIGS. 5(*a*) and 5(*b*), the server may perform a binarization process on the original image as shown in FIG. 5(*a*) to obtain the binarized outline image as shown in FIG. 5(*b*). For example, a pixel value of each pixel may be a grayscale value ranging from 0 to 255, and a pixel value threshold may be 200. Thus, a pixel value of a pixel in the original image having the pixel value greater than or equal to 200 is reset to be 1, and a pixel value of a pixel in the original image having the pixel value less than 200 is reset to be 0, thereby obtaining the binarized outline image.

Next, the server uniformly divides the binarized outline image into M regions, where M is a positive integer and is greater than N (i.e., M>N). Thereafter, the server calculates the number of pixels each having a nonzero pixel value in each of the M regions. For example, for each region, the number of pixels each having a nonzero pixel value therein is compared with a quantity threshold, to obtain N regions each of which has the number of pixels each having a nonzero pixel value greater than or equal to the quantity threshold. Then, according to positions of the N regions in the binarized outline image, the server determines N regions of the original image as to-be-encrypted regions.

Referring to FIGS. 5(*a*), 5(*b*) and 5(*c*), the server may obtain the binarized outline image as shown in FIG. 5(*b*) from the original image as shown in FIG. 5(*a*). Next, the server uniformly divides the binarized outline image into 6*4 (i.e., rows*columns) (here, M=6*4=24) regions. Thereafter, the server calculates the number of pixels each having a pixel value of 1 in each of the 24 regions. Then, the number of pixels each having a pixel value of 1 in each region is compared with a quantity threshold (which is, for example, 1) to obtain N regions each of which has the number of pixels each having a pixel value of 1 greater than or equal to the quantity threshold (which is, for example, 1), i.e., the 10 regions, as indicated by the dashed line boxes, in the binarized outline image as shown in FIG. 5(*b*).

Then, according to positions of the 10 regions in the binarized outline image, the server may determine 10 to-be-encrypted regions of the original image. For example, position data of pixels at four corners of a region corresponding to the second row and the second column as shown in FIG. 5(*c*), size data of this region, pixel data of each pixel in this region may be determined, and may be stored in association with the corresponding original image (or the corresponding GIF file) in a memory of the server. Upon receiving an original image obtaining request, the server may send the original image (or the GIF file) and the associated position data of pixels, size data, and pixel data of each pixel of each encrypted region to a user that sent the original image obtaining request. In an embodiment, since the determined 10 regions include adjacent regions, a merging process may be performed to finally obtain the 3 regions (here N=3) as shown in FIG. 5(*c*).

The third manner is as follows. The server may obtain a binarized outline image from an original image, and the obtaining method thereof may be the same as that shown in FIGS. 5(*a*) and 5(*b*). Thereafter, the server may employ a sliding window having a preset size, and move the sliding window by a preset step size, to obtain the number of pixels each having a pixel value of 1 in a region where the sliding window is located. Then, the server obtains a preset quantity threshold, and compares the number of pixels each having a pixel value of 1 in the region where the sliding window is located with the quantity threshold, to obtain N regions each of which has the number of pixels each having a pixel value of 1 in the region where the sliding window is located greater than or equal to the quantity threshold. Finally, according to positions of the N regions in the binarized outline image, the server determines N to-be-encrypted regions of the original image.

Figures 6A, 6B, 6C:
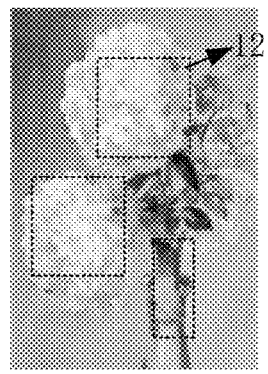
FIGS. 6(a) to 6(c) are schematic diagrams showing results of steps of a third method for obtaining N to-be-encrypted regions of an original image according to an embodiment of the present disclosure.

For example, referring to FIGS. 6(*a*), 6(*b*) and 6(*c*), the server may obtain the binarized outline image as shown in FIG. 6(*b*) from the original image as shown in FIG. 6(*a*). Thereafter, the server obtains a sliding window having a preset size of 1*2, and sets the preset step size to be 1 (i.e., moves rightwards by one column or downwards by one row each time, for example). Then, the server may sequentially move the sliding window rightwards or downwards by the preset step size, to obtain the number of pixels each having a pixel value of 1 in the region where the sliding window is located.

Here, the quantity threshold may be 2, and the server may compare the number of pixels each having a pixel value of 1 in the region where the sliding window is located with the quantity threshold of 2, to obtain 6 regions each of which has the number of pixels each having a pixel value of 1 in the region where the sliding window is located greater than or equal to 2, as shown in FIG. 6(*b*). It should be noted that, since the region denoted by the reference number 13' includes data shared by two adjacent regions 13 in the up and down direction, the region denoted by the reference number 13' may be canceled, and the data belong to the up and down regions, respectively. Further, the two regions in the second and third rows are adjacent to each other, and thus may be merged into one region. Similarly, the two regions in the fourth and fifth rows are adjacent to each other, and thus may be merged into one region. Finally, the selected regions are shown in FIG. 6(*c*), and the value of N is 3 here.

Finally, according to positions of the 3 regions in the binarized outline image, the server determines 3 to-be-encrypted regions 12 (which will become encrypted regions 12 after being encrypted) of the original image, thereby obtaining position data of pixels, size data, and pixel data of each pixel of each to-be-encrypted region 12 of the original image.

The fourth manner is as follows. The server may obtain a pixel value gradient map from an original image, and a method for obtaining the pixel value gradient map may be a known one in the art. Next, the server may determine P regions of the pixel value gradient map which have local extreme values (e.g., local maximum values), where P is a positive integer and is greater than N. Thereafter, the server determines a reference gradient value, and selects N regions, each of which has a local gradient extreme value greater than or equal to the reference gradient value, from the P regions. Finally, according to positions of the N regions in the pixel value gradient map, the server determines N to-be-encrypted regions of the original image. Here, the reference gradient value may be determined according to a specific scenario, and is not specifically limited herein.

Figures 7A, 7B, 7C:
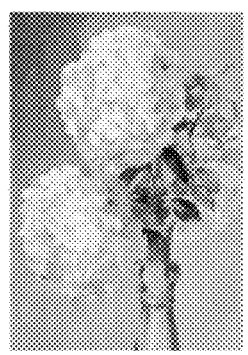
FIGS. 7(a) to 7(c) are schematic diagrams showing results of steps of a fourth method for obtaining N to-be-encrypted regions of an original image according to an embodiment of the present disclosure.

For example, referring to FIGS. 7(a), 7(b) and 7(c), the server may obtain the pixel value gradient map as shown in FIG. 7(b) from the original image as shown in FIG. 7(a). Then, the server selects 4 regions, each of which has a local maximum pixel value, from the pixel value gradient map as shown in FIG. 7(b), and the local maximum pixel values are 25, 23, 22 and 21, respectively. In a case where the reference gradient value is set to 15, 3 regions (here the value of N is 3) as shown in FIG. 7(c) may be obtained as follows: (20, 25, 18, 20), (19, 23, 22, 18) and (21, 15). Finally, according to positions of the 3 regions in the pixel value gradient map, the server determines 3 to-be-encrypted regions of the original image.

At step 302, each to-be-encrypted region of the original image is encrypted to obtain the second image.

In the present embodiment, for each to-be-encrypted region of the original image, the server encrypts the pixel data of the to-be-encrypted region by using a preset encryption algorithm, and then generates an image frame according to the encrypted pixel data, position data and size data of the to-be-encrypted region, thereby obtaining image frames corresponding to the N to-be-encrypted regions, i.e., obtaining the second image.

Alternatively, the server may combine the pixel data, position data and size data of the N to-be-encrypted regions together, and then encrypt the combined data to obtain the second image (which may be one image frame in this example).

For example, the encryption algorithm may by an encryption algorithm in the related art, such as a DES algorithm or a 3DES algorithm of a symmetric encryption algorithm. However, the present disclosure is not limited thereto, and one of ordinary skill in the art may select a suitable encryption algorithm according to a specific scenario.

At step 303, each to-be-encrypted region of the original image is filled (e.g., by using predetermined data) to obtain the first image.

In the present embodiment, after obtaining the N to-be-encrypted regions of the original image, the server may perform steps for generating the first image and the second image simultaneously. Alternatively, the step for generating the first image may be performed firstly, and then the step for generating the second image is performed. Alternatively, the step for generating the second image may be performed firstly, and then the step for generating the first image is performed. The present disclosure is not specifically limited in this regard.

The server may fill (or change) a pixel value of each pixel in each of the N to-be-encrypted regions, to obtain the first image. For example, a filling method may be any one of the following first filling method to third filling method.

The first filling method is as follows. The server may replace a pixel value of each pixel in each of the N to-be-encrypted regions with a pixel value of a predetermined color. For example, the predetermined color may be a single color such as red, green, blue, or the like, and the server may replace a pixel value of each pixel in each of the N to-be-encrypted regions with a pixel value of the single color. Alternatively, the predetermined color may be an arrangement of a plurality of colors, and the server may replace pixel values of pixels in each of the N to-be-encrypted regions with pixel values of respective colors in the arrangement of a plurality of colors.

The second filling method is as follows. The server may replace a pixel value of each pixel in each of the N to-be-encrypted regions with random data. The server may generate the random data by using a random number generation algorithm, which has an output value ranging from 0 to 255. Then, the server may replace pixel values of pixels in each of the N to-be-encrypted regions with output values of the random number generation algorithm, respectively.

The third filling method is as follows. The server may replace pixel values of pixels in each of the N to-be-encrypted regions with pixel values of a specified image, respectively. For example, the specified image may be stored in the server in advance, and may have a size equal to or different from a size of the original image. The server may select any region, which has the same size as a size of each of the N to-be-encrypted regions, from the specified image, and then pixel data of the selected region of the specified image is employed to replace a corresponding to-be-encrypted region of the original image.

In an embodiment, the server may store the first image and the second image at different positions (e.g., different storage regions of a same memory, different memories, different computers), such that the first image and the second image may be transmitted in parallel, thereby increasing the transmission speed of the first image and the second image. Alternatively, the server may store the first image and the second image at a same position. In another embodiment, the server may store the first image and the second image as different frames of a same GIF file. In this case, the first image may be a first frame of the GIF file, and the second image may be any one or more frames of the GIF file after (or following) the first frame.

As described above, in the present embodiment, only the data of a portion (i.e., the at least one to-be-encrypted region) of the original image is encrypted, and the resultant GIF file (or the first image and the second image) may have a small amount of data, which may reduce the amount of data to be transmitted and the time to transmit the data. Further, an amount of data of the encrypted portion is small, thus the time required for decrypting the encrypted portion at the terminal device is short, which enables watching the original image in real time, thereby improving the usage experience of a user.

FIG. 8 is a schematic flowchart showing a method for transmitting an image according to an embodiment of the present disclosure. For example, the method for transmitting an image may be applied to the second device, and the second device may be a terminal device. Referring to FIG. 8, the method for transmitting an image may include steps 801 and 802.

At step 801, the second device may receive a GIF image transmitted from the first device. The GIF image may include the first image and the second image. The second image may include at least one encrypted region of an original image, and the first image may include the remaining region of the original image other than the at least one encrypted region, the remaining region being an unencrypted region.

In the present embodiment, a user may log in to the server through a browser running on a terminal device by using an IP address or the like, to view a pre-stored image. Referring to FIG. 9, the image seen by the user may include a plurality of encrypted regions, preventing the user from seeing the full (or entire) original image. In a case where the user sees a favorite image, the user may click, for example by using a mouse, on a specified region (e.g., any one of the three encrypted regions 12) of the image. The terminal device may monitor a trigger event (e.g., the operation of clicking on at least one of the encrypted regions) of the user in real time or periodically, for example, in the background. After detecting the trigger event, the terminal device may generate an original image obtaining request, which includes at least an identification code of an original image, such that the server may retrieve the original image or the GIF file corresponding to the original image according to the identification code of the original image. Thereafter, the terminal device may send the original image obtaining request to the server.

It should be noted that, to help the user to view the original image, a prompt message may be displayed at a specified position. The specified position may be a position on the screen of a display, for example, may be the encrypted region of the displayed image. For example, the prompt message may be "Encrypted region, please click thereon to view", such that the user is guided to complete viewing of the encrypted region.

In the present embodiment, after sending the original image obtaining request, the terminal device may monitor a response from the server in real time. After receiving the original image obtaining request, the server may provide the GIF file corresponding to the original image to the terminal device, in response to the original image obtaining request. In this way, the terminal device may receive the GIF file, which includes the first image and the second image, the second image includes the encrypted region(s) of the original image, the first image includes the remaining region 11 of the original image other than the encrypted region(s), and the remaining region 11 is an unencrypted region, as shown in FIGS. 9 and 10.

At step 802, the second device may restore the original image from the GIF image (i.e., the GIF file).

In an embodiment, the GIF file includes the first image and the second image. The terminal device may directly read the first image and the second image from the GIF file.

In another embodiment, the server may send one or more storage address(es) (e.g., one or more uniform resource locators (URLs)) of the first image and the second image to the terminal device, and in this case, the terminal device may download the first image and the second image by using the one or more storage address(es). In a case where the first image and the second image are stored at a same position, the terminal device may find out the first image and the second image according to the storage address, and may sequentially download the image frames of the first image and the second image according to the storage order of the first image and the second image.

In a case where the first image and the second image are stored at different positions, the terminal device may download the first image and the second image in parallel by using the storage addresses of the first image and the second image, thereby increasing the download speed.

In the present embodiment, after obtaining the first image and the second image, the terminal device may restore the original image based on the first image and the second image.

The restoration of the original image may include the following steps. If the second image is encrypted by the server using its own private key, the terminal device obtains the public key (which is stored on the terminal device in advance) corresponding to the private key to decrypt each frame of the second image, so as to obtain the position data, size data, and pixel data contained in the frame. Thereafter, the terminal device superposes each frame of the second image to the first image according to the position data and the size data of the frame, and the superposing position is a corresponding to-be-encrypted region 12 or a corresponding encrypted region 12 of the original image (indicated by a dashed box). The above superposing step may be repeated until all frames of the second image are superposed to the corresponding positions in the first image, thereby obtaining the original image 10 as shown in FIG. 10.

Finally, the terminal device may display the original image 10 on its screen for viewing by the user.

As described above, the second image of the GIF file in the present embodiment is generated based on encryption of the data of the to-be-encrypted region(s) of the original image, and thus the GIF file may have a small amount of data, which may reduce the amount of data to be transmitted between the terminal device and the server, thereby reducing the time for the terminal device to receive the GIF file. Further, an amount of data of the encrypted portion of the GIF file is small, thus the time required for decrypting the encrypted portion is short, which enables watching the original image in real time, thereby improving the usage experience of a user.

Figure 11:
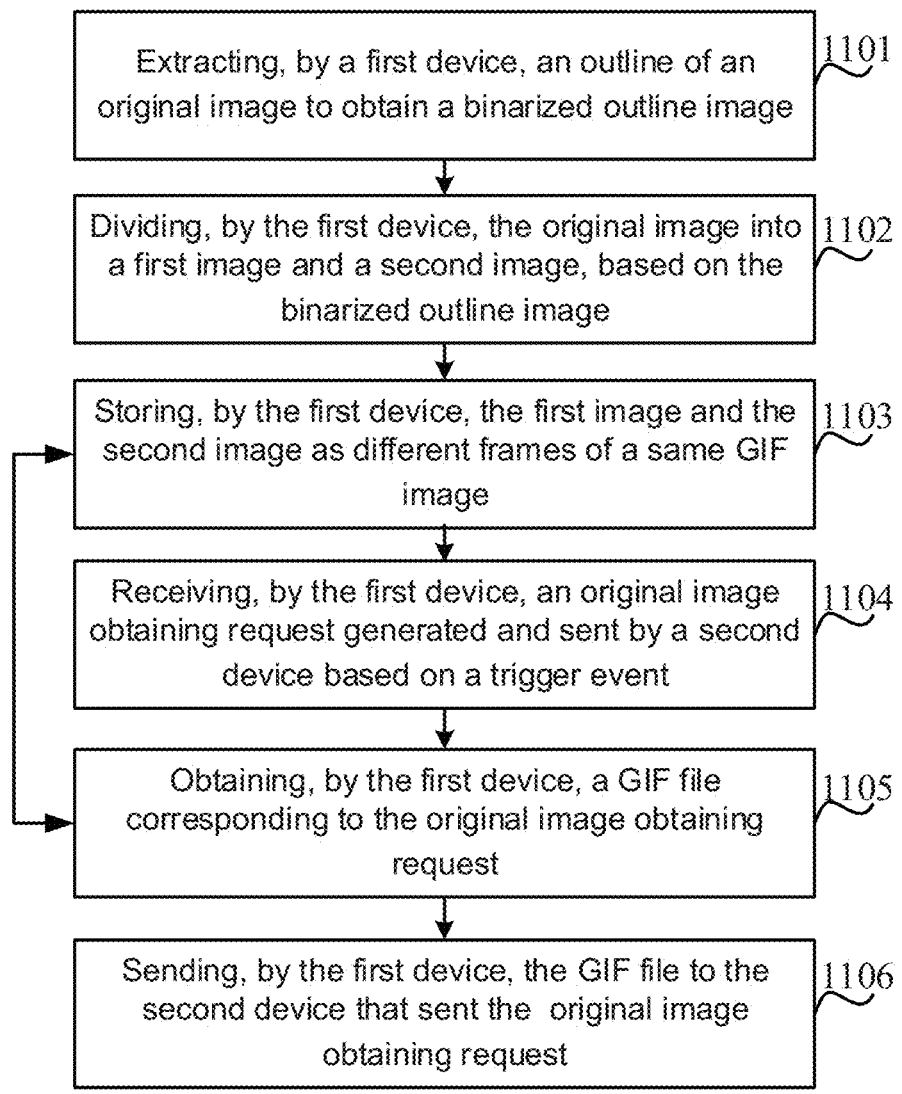
FIG. 11 is a schematic flowchart showing another method for transmitting an image according to an embodiment of the present disclosure.

FIG. 11 is a schematic flowchart showing a method for transmitting an image according to an embodiment of the present disclosure. For example, the method for transmitting an image may be applied to the first device, and the first device may be the server. Referring to FIG. 11, the method may include the following steps 1101 to 1106.

In the present embodiment, the server may edit the original image stored therein in advance as a GIF file, as shown in steps 1101, 1102, and 1103. The steps 1101 and 1102 may be similar to the steps 201 and 202 of the method for encrypting an image as shown in FIG. 2, and detailed description thereof may be referred to the description of the steps 201 and 202 as shown in FIG. 2. Further, the step 1103 may be referred to the foregoing description (e.g., the paragraph immediately following the paragraph describing the "third filling method"), and detailed description thereof is omitted here.

In the present embodiment, after receiving the original image obtaining request (step 1104), the server finds the GIF file of a corresponding original image, from the GIF files stored in the server, based on the original image obtaining request (step 1105). Finally, the server sends the found GIF file to the terminal device (step 1106).

As described above, in the present embodiment, the server generates the second image by encrypting the to-be-encrypted region(s) of the original image, and then edits the unencrypted region of the original image to generate the first image. The first image and the second image may be combined to generate a GIF file. In this way, an amount of data to be communicated between the server and the terminal device may be decreased. Further, in the present embodiment, the server may generate the GIF file of an original image in advance, and retrieve the GIF file corresponding to an original image obtaining request after receiving the original image obtaining request, thereby reducing the response time of the server. Further, since the encrypted region(s) are only a portion of the original image, an amount of the encrypted data is small, such that the terminal device may take a short time to decrypt the encrypted data, which enables watching the original image in real time, thereby improving the usage experience of a user.

Figure 12:
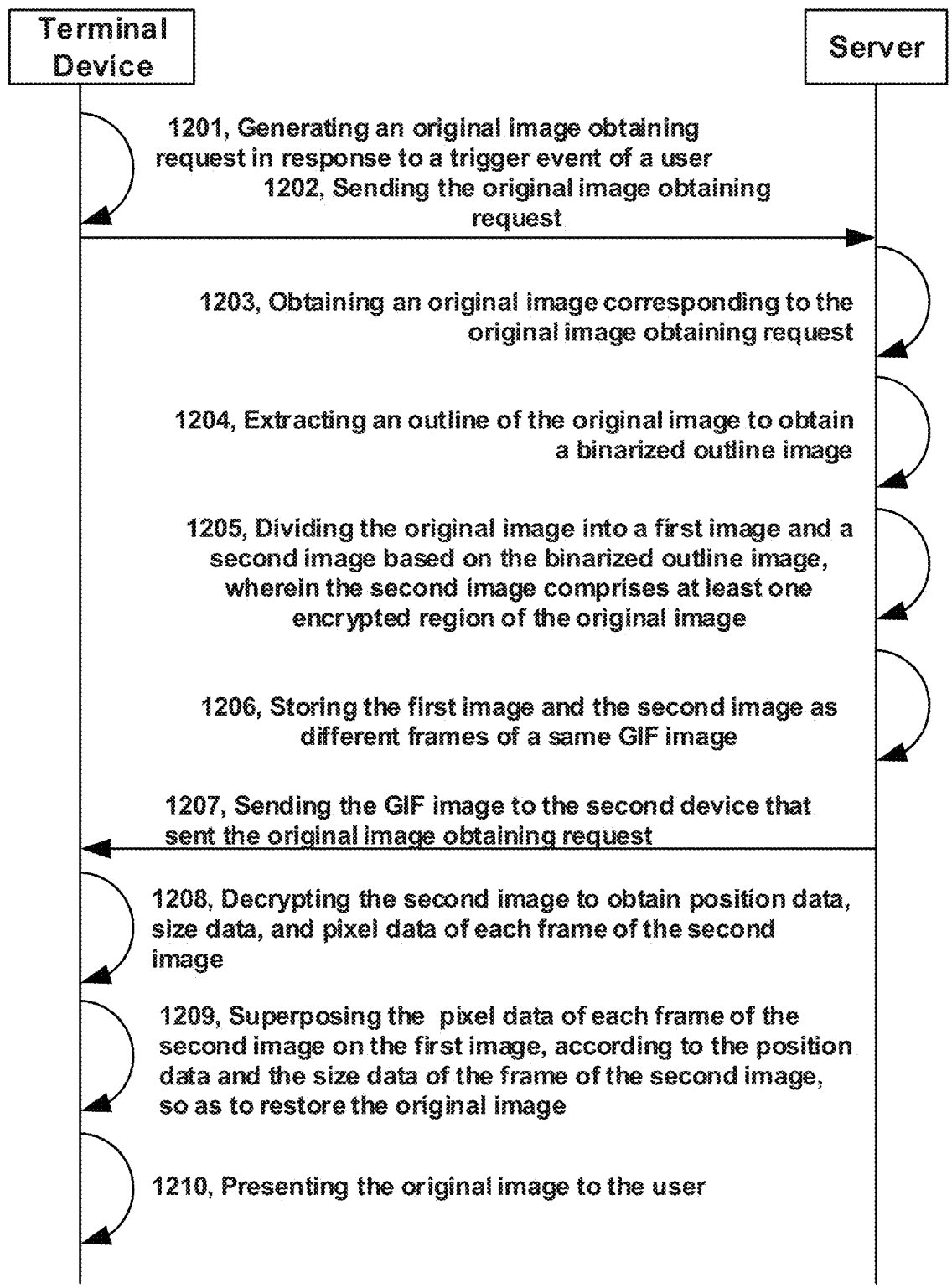
FIG. 12 is a schematic flowchart showing still another method for transmitting an image according to an embodiment of the present disclosure.

FIG. 12 is a schematic flowchart showing a method for transmitting an image according to an embodiment of the present disclosure. For example, the method for transmitting an image may be applied to the image transmission system as shown in FIG. 1, in which the first device may be a server, and the second device may be a terminal device. Referring to FIG. 12, the method for transmitting an image may include the following steps 1201 to 1206.

The terminal device may generate an original image obtaining request in response to a trigger event of a user (step 1201), and then the terminal device may send the original image obtaining request to the server (step 1202).

After receiving the original image obtaining request, the server may obtain the original image corresponding to the original image obtaining request (step 1203). Then, the server may extract an outline of the original image to obtain a binarized outline image (step 1204). Next, the server may divide the original image into a first image and a second image based on the binarized outline image, such that the second image includes at least one encrypted region of the original image (step 1205). Then, the server may store the first image and the second image as different frames of a same GIF image (step 1206). Thereafter, the server may send the GIF file (i.e., the GIF image) to the terminal device (step 1207).

After receiving the GIF file, the terminal device may obtain the first image and the second image from the GIF file. Then, the terminal device may obtain the position data, size data, and pixel data of each frame of the second image by decrypting the second image (step 1208). Thereafter, the terminal device may superpose the pixel data of each frame of the second image to the first image, according to the position data and the size data of the frame, thereby restore the original image (step 1209). Finally, the terminal device may present the original image to the user, i.e., the terminal device may display the original image on its screen for viewing by the user (step 1210).

As described above, in the present embodiment, the user may obtain the GIF file transmitted from the server by triggering the terminal device, and then the terminal device may restore the original image and represent the original image to the user. Since only the second image of the GIF file is generated based on encryption of the data of a portion of the original image, and thus the GIF file may have a small amount of data, which may reduce the amount of data to be transmitted between the terminal device and the server, thereby increasing the data transmission speed. Further, an amount of data of the second image decrypted by the terminal device is small, thus the time required for decrypting the second image by the terminal device is short, which enables watching the original image in real time, thereby improving the usage experience of a user.

Figure 13:
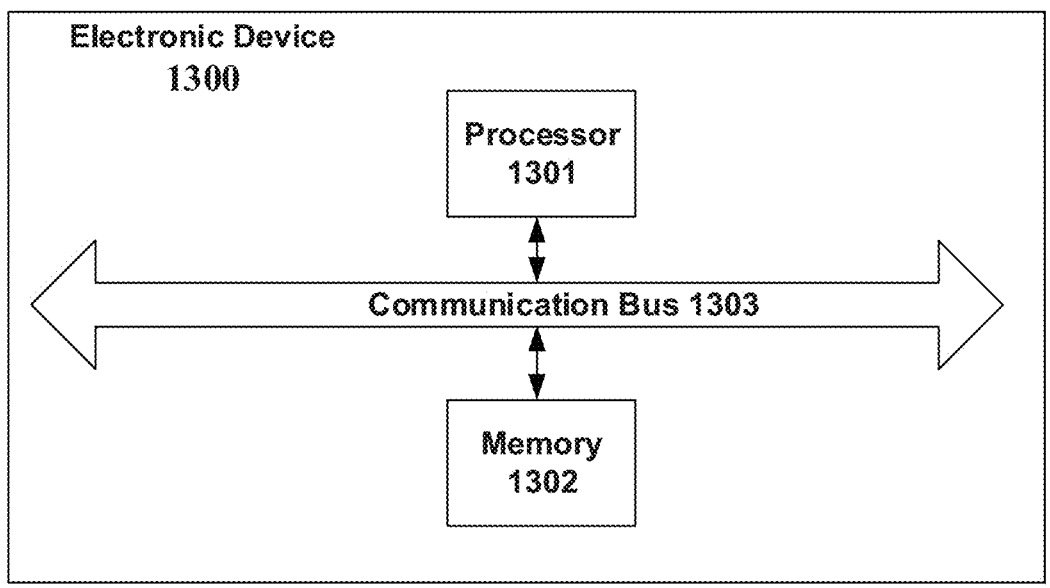
FIG. 13 is a schematic block diagram showing an electronic device according to an embodiment of the present disclosure.

FIG. 13 is a schematic block diagram showing an electronic device according to an embodiment of the present disclosure. Referring to FIG. 13, the electronic device 1300 may be the first device or the second device. Each of the first device and the second device may be a server or a terminal device. The electronic device 1300 may include a processor 1301 and a memory 1302 which has program instructions executable by the processor 1301 stored therein. Further, the processor 1301 may communicate with the memory 1302 via a communication bus 1303, and may read the program instructions from the memory 1302 to implement the steps of any one of the methods shown in FIGS. 2 to 12. In an embodiment, the electronic device may further include a communication interface (not shown) or the like, and the communication interface may be connected to the communication bus 1303.

An embodiment of the present disclosure provides a readable storage medium (e.g., a computer readable storage medium) having computer program instructions stored thereon, and the program instructions, when being executed by a processor, cause the processor to implement the steps of any one of the methods shown in FIGS. 2 to 12. It should be noted that, the readable storage medium may be applied to the terminal device, the server, or an image transmission system including the terminal device and the server, which may be determined by one of ordinary skill in the art according to a specific scenario and will not be limited herein.

In the present disclosure, the terms "first", "second", and the like, are employed to distinguish one element or feature from another element or feature, and are not to be construed as indicating or implying any relative importance or order. The term "a plurality of" or the like refers to two or more, unless otherwise specified in the context.

Other embodiments of the present disclosure will be apparent to one of ordinary skill in the art after considering and understanding the embodiments described herein. The present disclosure is intended to cover any variations, usages, or adaptive change of the present disclosure, which are in accordance with the general principles of the present disclosure and may include common knowledge and/or customary technical means in the art that are not disclosed herein. The specification and the embodiments are to be regarded as illustrative only, and the true scope and spirit of the present disclosure are defined by the appended claims.

It should be understood that, the present disclosure is not limited to the precise structures or forms described above and illustrated in the drawings, and various modifications and changes may be made thereto without departing from the scope thereof. The scope of the present disclosure is to be limited only by the appended claims.

What is claimed is:

1. A method for encrypting an image, comprising steps of
extracting an outline of an original image to obtain a binarized outline image;
dividing the original image into a first image and a second image based on the binarized outline image, wherein the second image comprises at least one encrypted region of the original image, the first image comprises the remaining region of the original image other than the at least one encrypted region, and the remaining region is an unencrypted region; and
storing the first image and the second image as different frames of a same GIF image.

2. The method according to claim 1, wherein the step of dividing the original image into a first image and a second image based on the binarized outline image comprises steps of
determining a to-be-encrypted region of the original image based on the binarized outline image; and
encrypting the to-be-encrypted region of the original image to obtain the second image.

3. The method according to claim 2, wherein the step of dividing the original image into a first image and a second image based on the binarized outline image further comprises a step of
filling the to-be-encrypted region of the original image to obtain the first image.

4. The method according to claim 2, wherein the step of determining a to-be-encrypted region of the original image based on the binarized outline image comprises steps of
dividing the binarized outline image into a plurality of binarized outline regions;
for each binarized outline region, calculating a number of pixels each having a nonzero pixel value in the binarized outline region, to obtain a pixel density value of the binarized outline region; and
determining a region of the original image corresponding to the binarized outline region, which has the pixel density value greater than or equal to a preset density threshold value, as the to-be-encrypted region.

5. The method according to claim 2, wherein the step of determining a to-be-encrypted region of the original image based on the binarized outline image comprises steps of
dividing the binarized outline image into a plurality of binarized outline regions having an identical area;
for each binarized outline region, calculating a number of pixels each having a grayscale value greater than or equal to a grayscale threshold value; and
determining a region of the original image corresponding to the binarized outline region, which has the number of pixels greater than or equal to a quantity threshold, as the to-be-encrypted region.

6. The method according to claim 2, wherein the step of determining a to-be-encrypted region of the original image based on the binarized outline image comprises steps of
dividing the binarized outline image into a plurality of binarized outline regions having an identical area;
moving a sliding window having a preset size rightwards or downwards by a preset step size to pass through the plurality of binarized outline regions sequentially, to obtain a number of pixels each having a nonzero pixel value in a region where the sliding window is located; and
determining a region of the original image corresponding to the binarized outline region, which has the number of pixels greater than or equal to a quantity threshold, as the to-be-encrypted region.

7. The method according to claim 2, wherein the step of determining a to-be-encrypted region of the original image based on the binarized outline image comprises steps of
obtaining a pixel value gradient map of the original image;
determining a plurality of pixel value gradient map regions, which have local maximum pixel values in the pixel value gradient map; and
determining a region of the original image corresponding to the pixel value gradient map region, which has the local maximum pixel value greater than or equal to a reference gradient value, as the to-be-encrypted region.

8. The method according to claim 3, wherein the step of filling the to-be-encrypted region of the original image to obtain the first image comprises a step of
replacing a pixel value of each pixel in the to-be-encrypted region with a pixel value of a predetermined color.

9. The method according to claim 3, wherein the step of filling the to-be-encrypted region of the original image to obtain the first image comprises a step of
replacing a pixel value of each pixel in the to-be-encrypted region with a pseudorandom data ranging from 0 to 255.

10. The method according to claim 3, wherein the step of filling the to-be-encrypted region of the original image to obtain the first image comprises a step of
replacing pixel values of pixels in the to-be-encrypted region with pixel values of pixels of a specified image, respectively.

11. The method according to claim 1, wherein the first image is a first frame of the GIF image, and the second image is any one or more frames of the GIF image following the first frame.

12. The method according to claim 1, further comprising a step of
storing the first image and the second image at different positions.

13. An electronic device, comprising
a processor; and
a memory storing therein program instructions executable by the processor,
wherein the processor is configured to read the program instructions from the memory to implement the steps of the method according to claim 1.

14. A non-transitory computer readable storage medium, comprising program instructions stored therein, wherein the program instructions is executable by a processor to implement the steps of the method according to claim 1.

15. A method for transmitting an image, comprising steps of
transmitting, by a first device, a GIF image to a second device, wherein the GIF image comprises a first image and a second image, the second image comprises at least one encrypted region of an original image, the first image comprises the remaining region of the original image other than the at least one encrypted region, the remaining region is an unencrypted region, and the first image and the second image are stored as different frames of the GIF image;
receiving, by the second device, the GIF image transmitted from the first device; and
restoring the original image from the GIF image by the second device.

16. The method according to claim 15, wherein the first device is a server or a terminal device, and the second device is a server or a terminal device.

17. The method according to claim 15, wherein a key for decrypting the second image is stored in the second device.

18. The method according to claim 15, wherein the step of restoring the original image from the GIF image by the second device comprises steps of
decrypting the at least one encrypted region included in the second image; and
superposing the at least one encrypted region on the remaining region included in the first image.

19. The method according to claim 15, wherein the first image is a first frame of the GIF image, and the second image is any one or more frames of the GIF image following the first frame.

20. A method for transmitting an image, comprising steps of
extracting, by a first device, an outline of an original image to obtain a binarized outline image;
dividing, by the first device, the original image into a first image and a second image, based on the binarized outline image, wherein the second image comprises at least one encrypted region of the original image, the first image comprises the remaining region of the original image other than the at least one encrypted region, and the remaining region is an unencrypted region;
storing, by the first device, the first image and the second image as different frames of a same GIF image;
receiving, by the first device, an original image obtaining request generated by a second device based on a trigger event;
obtaining, by the first device, a GIF file corresponding to the original image obtaining request; and
sending, by the first device, the GIF file to the second device.

* * * * *